US012669955B2

(12) United States Patent
Lee et al.

(10) Patent No.: US 12,669,955 B2
(45) Date of Patent: Jun. 30, 2026

(54) STORAGE DEVICE, METHOD OF OPERATING THE SAME, AND MEMORY CONTROLLER

(71) Applicant: SK hynix Inc., Icheon (KR)

(72) Inventors: Dong Sop Lee, Icheon (KR); Ie Ryung Park, Icheon (KR); Tae Ho Lim, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 18/457,179

(22) Filed: Aug. 28, 2023

(65) Prior Publication Data

US 2024/0302993 A1 Sep. 12, 2024

(30) Foreign Application Priority Data

Mar. 6, 2023 (KR) ........................ 10-2023-0029313

(51) Int. Cl.
*G06F 3/06* (2006.01)
(52) U.S. Cl.
CPC .......... *G06F 3/0656* (2013.01); *G06F 3/0604* (2013.01); *G06F 3/0679* (2013.01)
(58) Field of Classification Search
CPC .... G06F 3/0656; G06F 3/0604; G06F 3/0679; G06F 3/061; G06F 3/0614; G06F 3/064; G06F 3/0658; G06F 3/0659; G06F 2212/1016; G06F 2212/1032

USPC ......................................................... 711/154
See application file for complete search history.

(56) References Cited

U.S. PATENT DOCUMENTS

| 2006/0282644 | A1  | 12/2006 | Wong  |            |
|--------------|-----|---------|-------|------------|
| 2011/0208898 | A1* | 8/2011  | Shin  | G06F 12/0246 |
|              |     |         |       | 711/E12.008 |
| 2020/0150896 | A1* | 5/2020  | Kim   | G06F 3/0611 |
| 2021/0255949 | A1* | 8/2021  | Guda  | G06F 12/0292 |
| 2022/0013178 | A1* | 1/2022  | Yang  | G11C 16/0483 |
| 2022/0050626 | A1* | 2/2022  | Oh    | G06F 3/0656 |
| 2022/0066692 | A1* | 3/2022  | Noh   | G06F 3/0679 |

FOREIGN PATENT DOCUMENTS

KR         1020220009523 A    1/2022

* cited by examiner

*Primary Examiner* — Hua J Song

(57) ABSTRACT

According to an embodiment of the present disclosure, a storage device may include a memory device including a plurality of zones, a memory device including a plurality of zones; a buffer memory device including a plurality of slots; and a memory controller including a plurality of zone buffers respectively corresponding to the plurality of zones. The memory controller may store write data in one or more of the plurality of slots, store map data corresponding to the write data in a zone buffer that corresponds to a zone in which the write data is to be stored, and then store the write data, which is stored in the one or more slots, in the zone corresponding to the zone buffer based on the map data stored in the zone buffer.

16 Claims, 15 Drawing Sheets

| |
|---|
| Slot 0 |
| Slot 1 |
| Slot 2 |
| Slot 3 |
| ⋮ |
| Slot N |

| W.Data 0 (Slot 0) |
| Slot 1 |
| Slot 2 |
| Slot 3 |
| ⋯ |
| Slot N |

200

Memory Controller

210

211

M.Data 0 (Slot 0)

Slot Info.

Map Data

220

| Zone Buffer 0 | Zone Buffer 1 | Zone Buffer 2 | ⋯ | Zone Buffer n |

400

Host

W.Data

Figure 10:
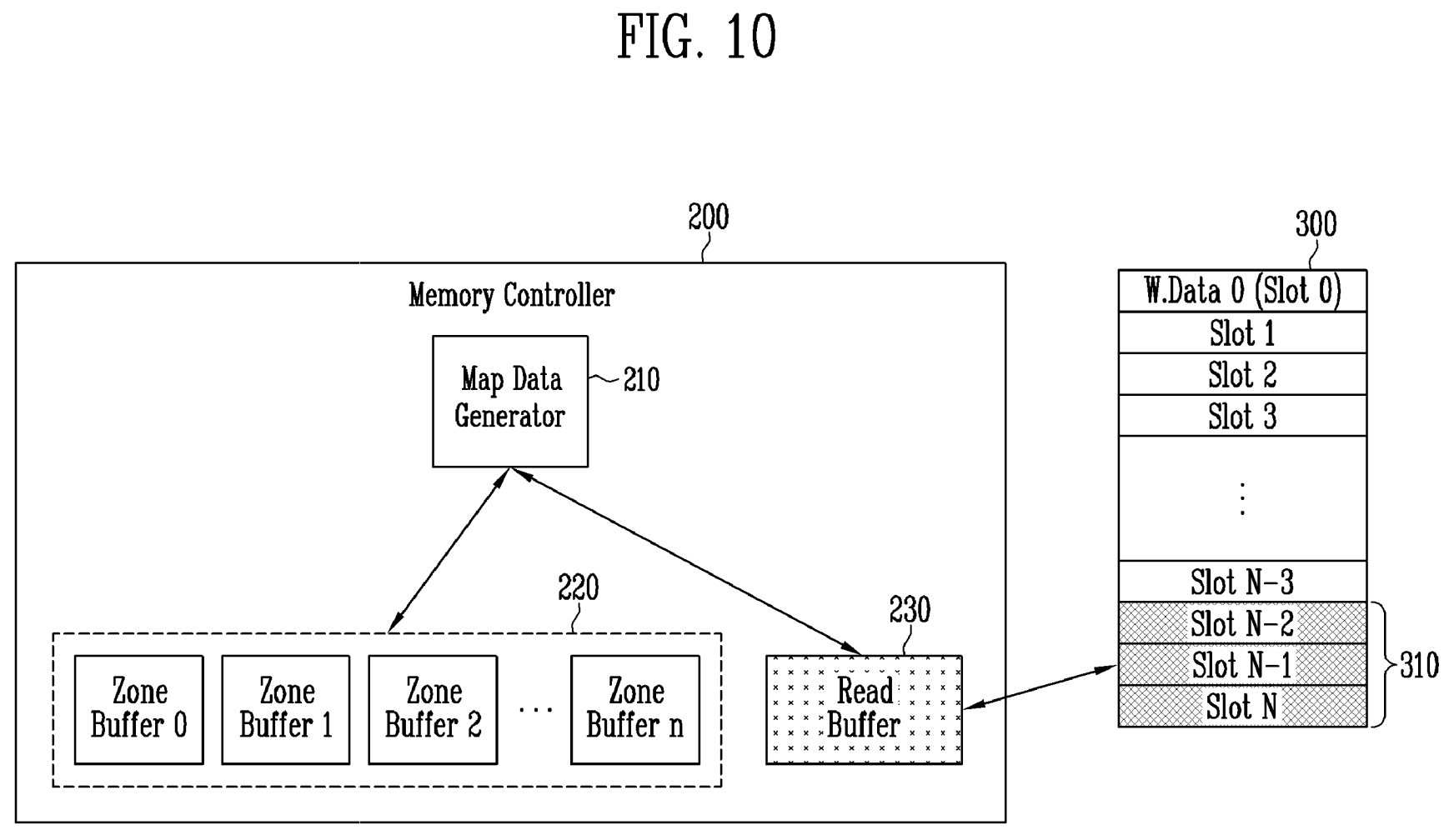

| W.Data 0 (Slot 0) |
| Slot 1 |
| Slot 2 |
| Slot 3 |
| . . . |
| Slot N−3 |
| Slot N−2 |
| Slot N−1 |
| Slot N |

310

200

Memory Controller

210 — Map Data Generator

230 — Read Buffer

220

Zone Buffer 0

Zone Buffer 1

Zone Buffer 2

. . .

Zone Buffer n

1000

STORAGE DEVICE, METHOD OF OPERATING THE SAME, AND MEMORY CONTROLLER

CROSS-REFERENCE TO RELATED APPLICATION

The present application claims priority under 35 U.S.C. § 119(a) to Korean patent application number 10-2023-0029313 filed on Mar. 6, 2023, in the Korean Intellectual Property Office, the entire disclosure of which is incorporated by reference herein.

BACKGROUND

1. Field of Invention

The present disclosure relates to an electronic device, and more particularly, to a storage device, a method of operating the same, and a memory controller.

2. Description of Related Art

A storage device may be configured to store data provided from an external device in response to an external write request. In addition, a memory system may be configured to provide stored data to the external device in response to an external read request. The external device may include an electronic device capable of processing data, and may include a host device such as a computer, a digital camera, a mobile phone, or the like. The storage device may be embedded in the host device, or may be manufactured in a detachable form and connected to the host device.

The storage device may include a memory device serving as a buffer or a cache. The storage device may further include a buffer memory used to buffer data when storing the data in the memory device or reading the data stored in the memory device.

SUMMARY

An embodiment of the present disclosure provides a storage device with improved zone management efficiency, a method of operating the same, and a memory controller.

According to an embodiment of the present disclosure, a storage device may include a memory device including a plurality of zones; a buffer memory device including a plurality of slots; and a memory controller including a plurality of zone buffers respectively corresponding to the plurality of zones. The memory controller may store write data in one or more of the plurality of slots, store map data corresponding to the write data in a zone buffer that corresponds to a zone in which the write data is to be stored, and then store the write data, which is stored in the one or more slots, in the zone corresponding to the zone buffer based on the map data stored in the zone buffer.

According to an embodiment of the present disclosure, a method of operating a storage device may include storing write data received from an external device in one or more of a plurality of slots in a buffer memory device; generating map data corresponding to the write data; storing the map data in a zone buffer corresponding to a zone in a memory device in which the write data is to be stored; and storing the write data in a zone corresponding to the zone buffer based on the map data.

According to an embodiment of the present disclosure, a memory controller may include a map data generator configured to generate map data corresponding to write data based on a position in a buffer memory device in which the write data is stored; and a plurality of zone buffers respectively corresponding to a plurality of zones in a memory device. The map data is stored in a zone buffer corresponding to a zone in which the write data is to be stored, among the plurality of zone buffers.

According to the present technology, a storage device with improved zone management efficiency, a method of operating the same, and a memory controller are provided.

BRIEF DESCRIPTION OF THE DRAWINGS

FIG. 3 illustrates a memory cell array of FIG. 2.

FIG. 5 illustrates a buffer memory device of FIG. 1.

FIG. 6 illustrates a process of generating map data in a storage device according to an embodiment of the present disclosure.

FIG. 10 illustrates a storage device according to another embodiment of the present disclosure.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

Figure 1:
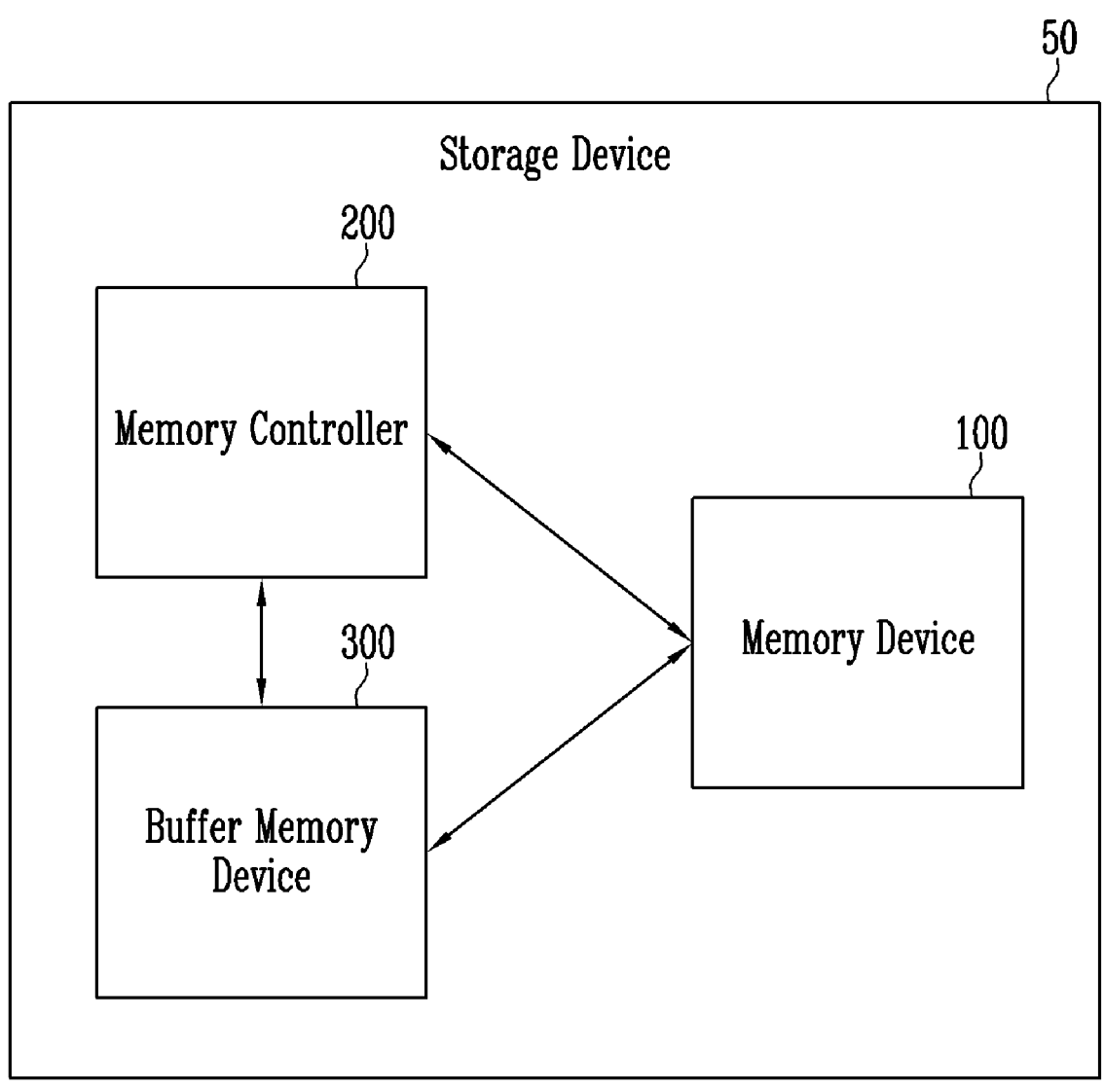
FIG. 1 illustrates a storage device according to an embodiment of the present disclosure.

FIG. 1 illustrates a storage device 50 according to an embodiment of the present disclosure.

Referring to FIG. 1, the storage device 50 may include a memory device 100, a memory controller 200, and a buffer memory device 300.

The storage device 50 may be a device that stores data under the control of a host (not shown) such as a cellular phone, a smartphone, an MP3 player, a laptop computer, a desktop computer, a game player, a TV, a tablet PC, or an in-vehicle infotainment system. Alternatively, the storage device 50 may be a device that stores data under the control of the host that stores high-capacity data in one place, such as a server or a data center. The storage device 50 may be manufactured as any one of various types of storage devices according to a host interface which is a communication method with the host. In addition, the storage device 50 may be manufactured as any one of various types of packages.

The memory device 100 may store data. The memory device 100 may operate under the control of the memory controller 200. The memory device 100 may include a memory cell array (not shown) including a plurality of memory cells that store data.

Each of the memory cells may be configured as a single level cell (SLC) that stores one-bit data, a multi-level cell (MLC) that stores two-bit data, a triple level cell (TLC) that stores three-bit data, or a quad level cell (QLC) capable of storing four-bit data.

The memory cell array (not shown) may include a plurality of memory blocks. Each memory block may include a plurality of pages. In an embodiment, the page may be a unit for storing data in the memory device 100 or reading data stored in the memory device 100. The memory block may be a unit for erasing data.

In an embodiment, the memory device 100 may be, for example, a volatile memory device or a nonvolatile memory device, and in the present specification, for convenience of description, it is assumed that the memory device 100 is a NAND flash memory.

The memory device 100 is configured to receive a command and an address from the memory controller 200 and access an area selected by the address in the memory cell array. The memory device 100 may perform an operation instructed by the command on the area selected by the address. For example, the memory device 100 may perform a write operation (or program operation), a read operation, and an erase operation.

During the program operation, the memory device 100 may program data in the area selected by the address. During the read operation, the memory device 100 may read data from the area selected by the address. During the erase operation, the memory device 100 may erase data stored in the area selected by the address. The memory device 100 will be described in more detail with reference to FIGS. 2 and 3.

The memory controller 200 may control an overall operation of the storage device 50.

When power is applied to the storage device 50, the memory controller 200 may execute firmware such as a flash translation layer (FTL) for controlling communication between the host and the memory device 100.

In an embodiment, the memory controller 200 may receive data and a logical address (LA) from the host and may convert the LA into a physical address (PA) indicating an address of memory cells in the memory device 100 in which the data is to be stored. In addition, in an embodiment, the memory controller 200 may generate map data including information indicating a position in the buffer memory device 300 in which the data received from the host is stored.

The memory controller 200 may control the memory device 100 to perform the program operation, the read operation, or the erase operation according to a request of the host. During the program operation, the memory controller 200 may provide a program command, the PA, and data to the memory device 100. During the read operation, the memory controller 200 may provide a read command and the PA to the memory device 100. During the erase operation, the memory controller 200 may provide an erase command and the PA to the memory device 100.

In an embodiment, the memory controller 200 may generate a command, an address, and data independently regardless of the request from the host and transmit the command, the address, and the data to the memory device 100. For example, the memory controller 200 may provide the command, the address, and the data for performing a program operation, a read operation, and an erase operation accompanying in performing wear leveling, read reclaim, garbage collection, or the like, to the memory device 100.

In an embodiment, the memory controller 200 may control at least two or more memory devices 100. In this case, the memory controller 200 may control the memory devices 100 according to an interleaving method to improve operation performance. The interleaving method may be a method of controlling operations for at least two memory devices 100 to overlap with each other. Alternatively, the interleaving method may be a method of controlling operations of a plurality of groups classified in one memory device 100 to overlap with each other. At this time, a group may be a unit of one or more memory dies or a unit of one or more memory planes. The memory controller 200 will be described in detail with reference to FIG. 4.

The buffer memory device 300 may temporarily store data transmitted between the host and the memory device 100. The buffer memory device 300 may include a plurality of slots in which data is stored. For example, the buffer memory device 300 may temporarily store data transmitted from the host before transmitting the data to the memory device 100 for a write operation of storing the data in the memory device 100. Alternatively, the buffer memory device 300 may temporarily store data transmitted from the memory device 100 before transmitting the data to the host for a read operation of reading the data from the memory device 100. In addition, the buffer memory device 300 may temporarily store the map data or data for a background operation, but is not limited thereto, and may be used as a buffer for temporarily storing data during various operations. The buffer memory device 300 will be described in more detail with reference to FIG. 5.

Figure 2:
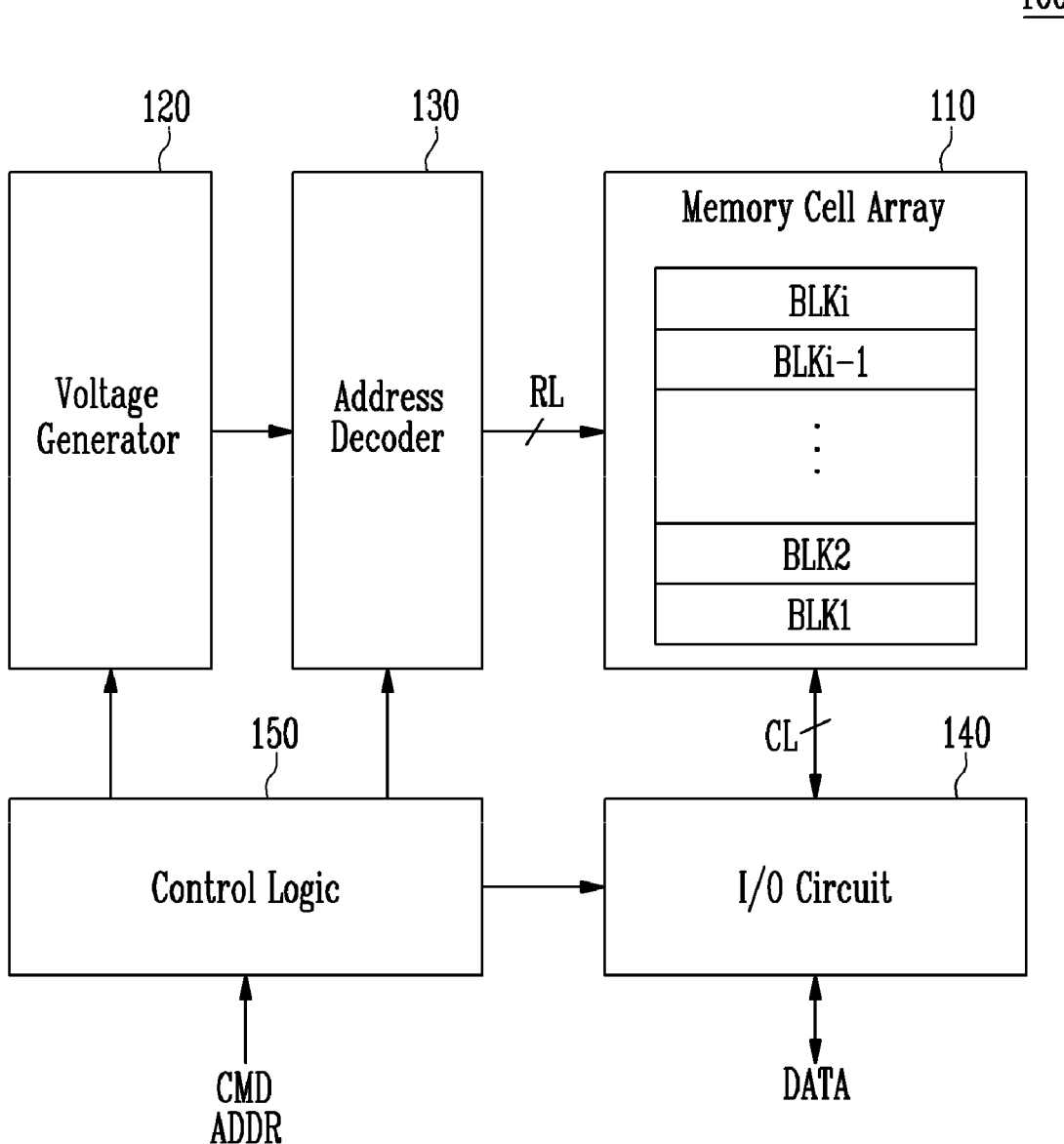
FIG. 2 illustrates a memory device of FIG. 1.

FIG. 2 illustrates the memory device 100 of FIG. 1.

Referring to FIG. 2, the memory device 100 may include a memory cell array 110, a voltage generator 120, an address decoder 130, an input/output circuit 140, and a control logic 150.

The memory cell array 110 includes a plurality of memory blocks BLK1 to BLKi. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 110 may include a plurality of physical pages. Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) capable of storing four data bits.

In an embodiment, the voltage generator 120, the address decoder 130, and the input/output circuit 140 may be collectively referred to as a peripheral circuit. The peripheral circuit may drive the memory cell array 110 under the control of the control logic 150. The peripheral circuit may drive the memory cell array 110 to perform the program operation, the read operation, and the erase operation.

The voltage generator 120 is configured to generate a plurality of operation voltages using an external power voltage supplied to the memory device 100. The voltage generator 120 operates in response to the control of the control logic 150.

As an embodiment, the voltage generator 120 may generate an internal power voltage by regulating the external power voltage. The internal power voltage generated by the voltage generator 120 is used as an operation voltage of the memory device 100.

As an embodiment, the voltage generator 120 may generate the plurality of operation voltages using the external power voltage or the internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate the plurality of operation voltages having various voltage levels, and may generate the plurality of operation voltages by selectively activating the plurality of pumping capacitors in response to the control of the control logic 150.

The generated plurality of operation voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address ADDR from the control logic 150. The address decoder 130 may decode a block address among the received addresses ADDR. The address decoder 130 selects at least one memory block among the memory blocks BLK1 to BLKi according to the decoded block address. The address decoder 130 may decode a row address among the received addresses ADDR. The address decoder 130 may select at least one word line among word lines of the selected memory block according to the decoded row address. In an embodiment, the address decoder 130 may decode a column address among the received addresses ADDR. The address decoder 130 may connect the input/output circuit 140 and the memory cell array 110 to each other according to the decoded column address.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, data may be stored in selected memory cells according to data stored in the plurality of page buffers.

During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to the command CMD transmitted from an external device. The control logic 150 may generate control signals in response to the command CMD and the address ADDR to control the peripheral circuits.

Figure 3:
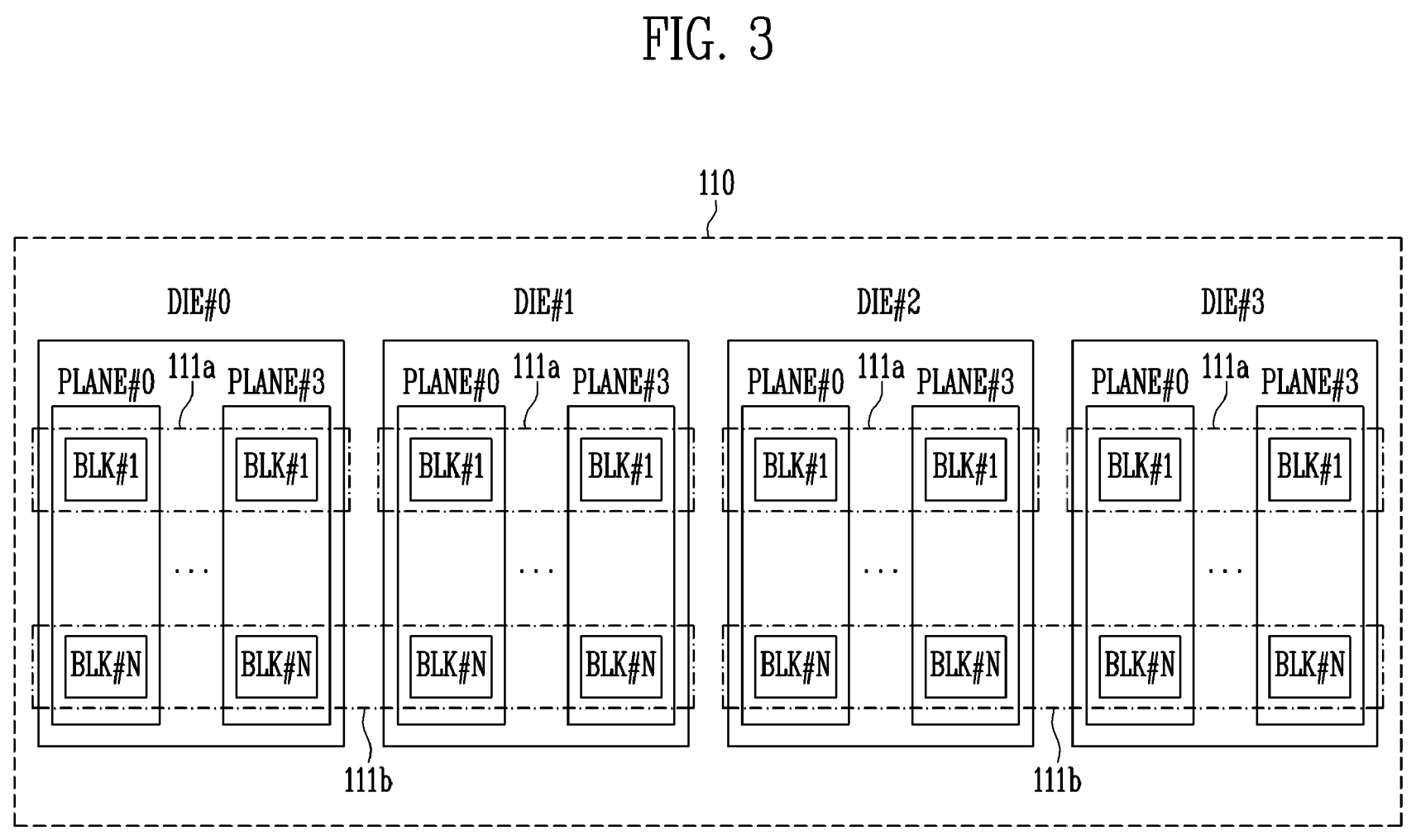

FIG. 3 illustrates the memory cell array 110 of FIG. 2.

Referring to FIGS. 1 and 3, the memory cell array 110 may include one or more memory dies, and each memory die may include one or more planes each including one or more memory blocks. In FIG. 3, the memory cell array 110 includes four memory dies DIE #0, DIE #1, DIE #2, and DIE #3, but the number of memory dies in the memory cell array 110 is not limited thereto. A plurality of memory dies may perform transmission and reception with the memory controller 200 through a plurality of channels, and each channel may be connected to one or more memory dies. For example, when one channel is connected to one memory die, the one memory die may receive one command at once, and planes included in the one memory die may process the command in parallel.

The memory controller 200 may control the memory cell array 110 of the memory device 100 by dividing the memory cell array 110 into a plurality of zones. Each of the plurality of zones may include one or more memory blocks. For example, as shown in FIG. 3, each memory die may include three planes PLANE #0 to PLANE #3. A zone 111a may include one memory block included in each of the three planes PLANE #0 to PLANE #3 for each memory die, and thus the zone 111a including three memory blocks may be formed for each memory die. Alternatively, a zone 111b may include memory blocks included in two different memory dies, and thus the zone 111b may include six memory blocks. In addition, although not shown in FIG. 3, in another embodiment, a zone may include only a portion of each of memory blocks included in different memory dies. In an embodiment, data to be stored in zones may be sequentially stored in the zones, but embodiments are not limited thereto.

Figure 4:
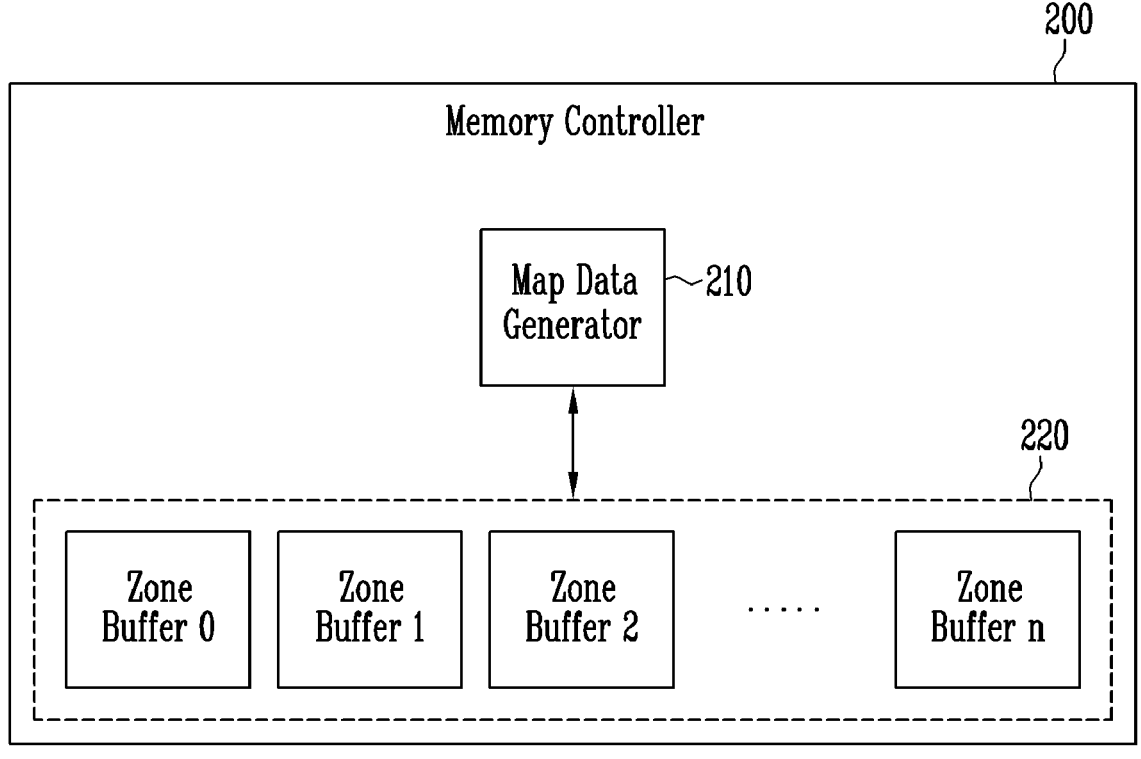
FIG. 4 illustrates a memory controller according to an embodiment of the present disclosure.

FIG. 4 illustrates a memory controller 200 according to an embodiment of the present disclosure.

Referring to FIG. 4, the memory controller 200 may include a map data generator 210 and a zone buffer unit 220.

The map data generator 210 may generate map data for write data received from an external device. Here, the map data may include information indicating a position in a buffer memory device (not shown) in which the write data is stored. For example, the map data may include a logical address corresponding to the write data that is received from the external device and stored in the buffer memory device (not shown) and information indicating the position in the buffer memory device corresponding to the write data.

The zone buffer unit 220 may include a plurality of zone buffers Zone Buffer 0 to Zone Buffer n, n being a positive integer. The plurality of zone buffers Zone Buffer 0 to Zone Buffer n may correspond to a plurality of zones in a memory device (not shown), respectively. The map data generated by the map data generator 210 may be stored in the zone buffer unit 220. For example, the map data may be stored in a zone buffer corresponding to a zone in which write data corresponding to the map data is to be stored, among the plurality of zone buffers Zone Buffer 0 to Zone Buffer n. That is, the map data generated by the map data generator 210 may be stitched with zone information of the zone in which the write data is to be stored.

Figure 5:
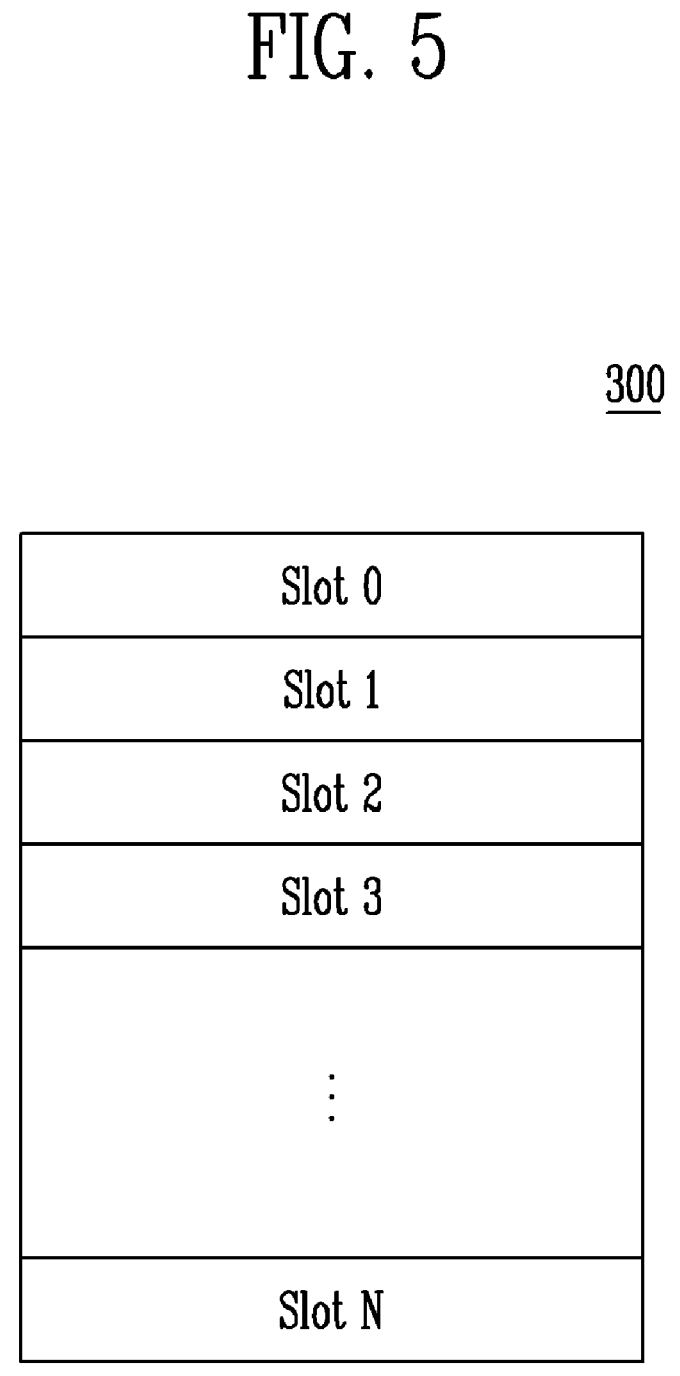

FIG. 5 illustrates the buffer memory device 300 of FIG. 1.

Referring to FIG. 5, the buffer memory device 300 may include a plurality of slots Slot 0 to Slot N for storing data. In an embodiment, write data may be stored in the buffer memory device 300 regardless of a zone in which the write data is to be stored. For example, the write data may be stored in slots in the order in which the write data is received from the outside, without dividing the zone in which the write data is to be stored.

In an embodiment, the buffer memory device 300 may include a DRAM and/or an SRAM. A slot, which is a unit of the buffer memory device 300, may have the same size as a unit for reading or writing data in a memory device (not shown). That is, the slot may have the same size as a page. In other embodiments, the slot may have a size that corresponds to N times or 1/N of the size of the unit for reading/writing (e.g., page) of the memory device. For example, the size of the slot may be 4 KB.

FIG. 6 illustrates a process of generating map data in a storage device according to an embodiment of the present disclosure.

Referring to FIG. 6, a memory controller 200 may receive write data W.Data from an external host 400, and the memory controller 200 may store the received write data W. Data in a buffer memory device 300. In an embodiment, the memory controller 200 may store at least a portion of data to be stored in a memory device in the buffer memory device 300, the data being received from the external host 400. In an embodiment, the portion of the data to be stored in the memory device may be stored in the buffer memory device 300 as the write data W. Data shown in FIG. 6, and the remaining portion of the data may not be stored in the buffer memory device 300.

In another embodiment, all data to be stored in the memory device may be stored in the buffer memory device 300 as the write data W. Data shown in FIG. 6. That is, in the present specification, the write data W. Data may refer to data stored in the buffer memory device 300 among the data to be stored in the memory device.

A map data generator 210 may generate map data based on slot information Slot Info. of the buffer memory device 300. For example, the map data generator 210 may generate map data M. Data 0 including information that write data W. Data 0 is stored in a slot Slot 0 of the buffer memory device 300. The map data M.Data 0 may include information indicating the slot Slot 0 in which the write data W. Data 0 is stored.

The map data generator 210 may store the generated map data in sectors 211 in the map data generator 210, and then store the map data in a zone buffer unit 220.

Figure 7:
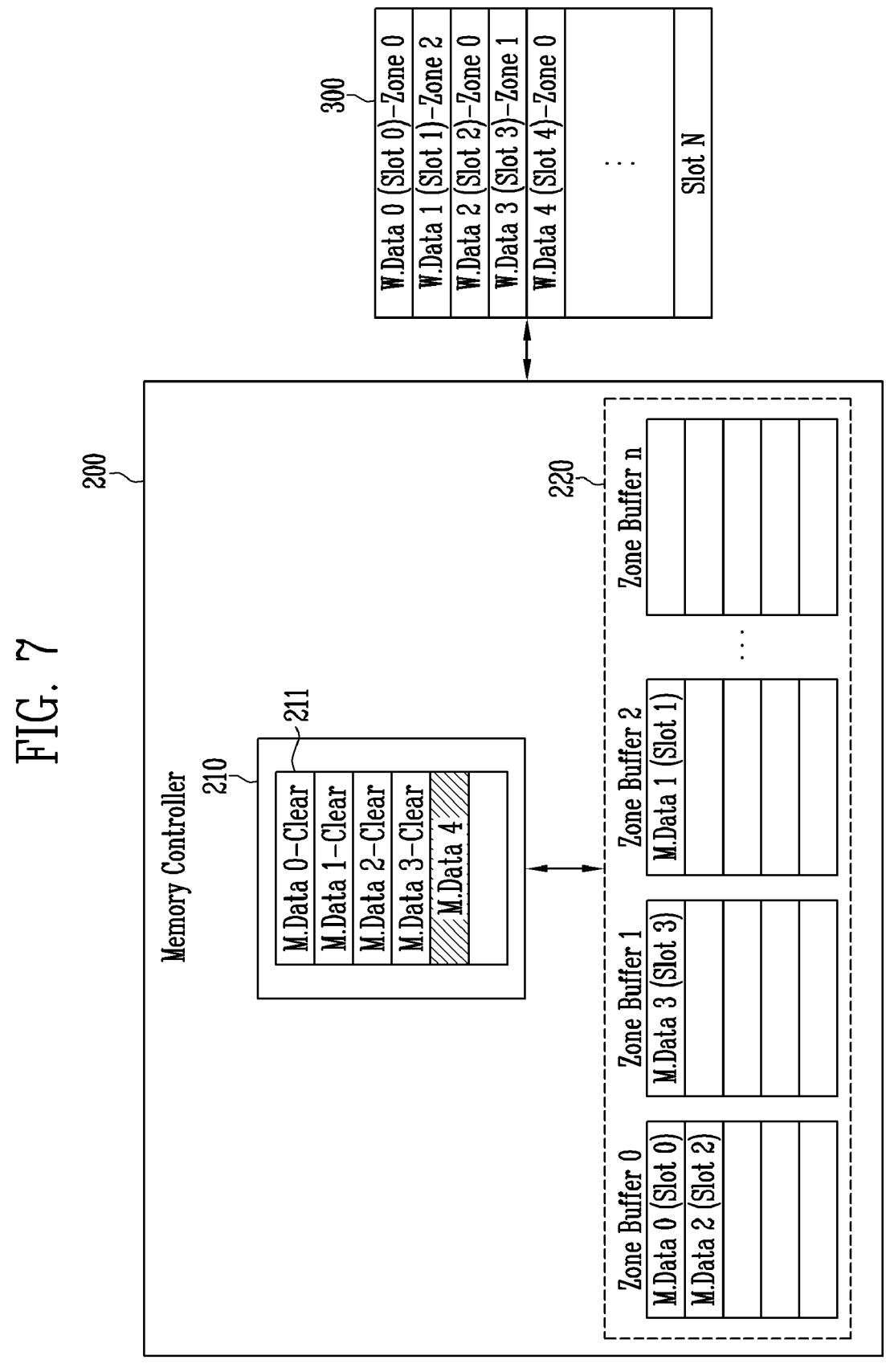
FIG. 7 illustrates a process of storing map data in a storage device according to an embodiment of the present disclosure.

FIG. 7 illustrates a process of storing map data in a storage device according to an embodiment of the present disclosure.

Referring to FIG. 7, write data W. Data 0 may be stored in a slot Slot 0 of a buffer memory device 300, and map data M. Data 0 corresponding to the write data W. Data 0 may be generated by a map data generator 210 and stored in a zone buffer Zone Buffer 0 of a zone buffer unit 220. Here, the zone buffer Zone Buffer 0 may be a zone buffer corresponding to a zone Zone 0 in which the write data W. Data 0 is to be stored.

In addition, write data W. Data 1 may be stored in a slot Slot 1 of the buffer memory device 300, and map data M. Data 1 corresponding to the write data W. Data 1 may be generated by the map data generator 210 and stored in a zone buffer Zone Buffer 2 of the zone buffer unit 220. Here, the zone buffer Zone Buffer 2 may be a zone buffer corresponding to a zone Zone 2 in which the write data W. Data 1 is to be stored.

In addition, write data W. Data 2 may be stored in a slot Slot 2 of the buffer memory device 300, and map data M.

Data 2 corresponding to the write data W. Data 2 may be generated by the map data generator 210 and stored in the zone buffer Zone Buffer 0. Here, the zone buffer Zone Buffer 0 may be a zone buffer corresponding to the zone Zone 0 in which the write data W. Data 2 is to be stored.

In addition, write data W. Data 3 may be stored in a slot Slot 3 of the buffer memory device 300, and map data M. Data 3 corresponding to the write data W. Data 3 may be generated by the map data generator 210 and stored in the zone buffer Zone Buffer 1. Here, the zone buffer 1 may be a zone buffer corresponding to the zone Zone 1 in which the write data W. Data 3 is to be stored.

In addition, write data W. Data 4 may be stored in a slot Slot 4 of the buffer memory device 300, and map data M. Data 4 corresponding to the write data W. Data 4 may be generated by the map data generator 210. In FIG. 7, the map data M. Data 4 may be positioned in a sector in the map data generator 210 before being stored in a zone buffer.

Once the map data M. Data 0, the map data M. Data 1, the map data M. Data 2, and the map data M. Data 3 are stored in their respective zone buffers within the zone buffer unit 220, sectors in the map data generator 210, where the map data M. Data 0 to the map data M. Data 3 are stored, may be cleared.

Since the map data M. Data 4 has not yet been stored in a zone buffer, the map data M. Data 4 may be stored in the sector in the map data generator 210. After that, when the map data M.Data 4 is stored in the zone buffer Zone Buffer 0 corresponding to the zone Zone 0, the sector in the map data generator 210, where the map data M. Data 4 is stored, may be erased or cleared.

In another embodiment, when map data is stored in the zone buffer unit 220, sectors in which the map data is stored in the map data generator 210 may not be cleared. Instead, the map data stored in the sectors may be invalidated. Therefore, the map data stored in the map data generator 210 may further include state information indicating whether the map data are valid or not.

Figure 8:
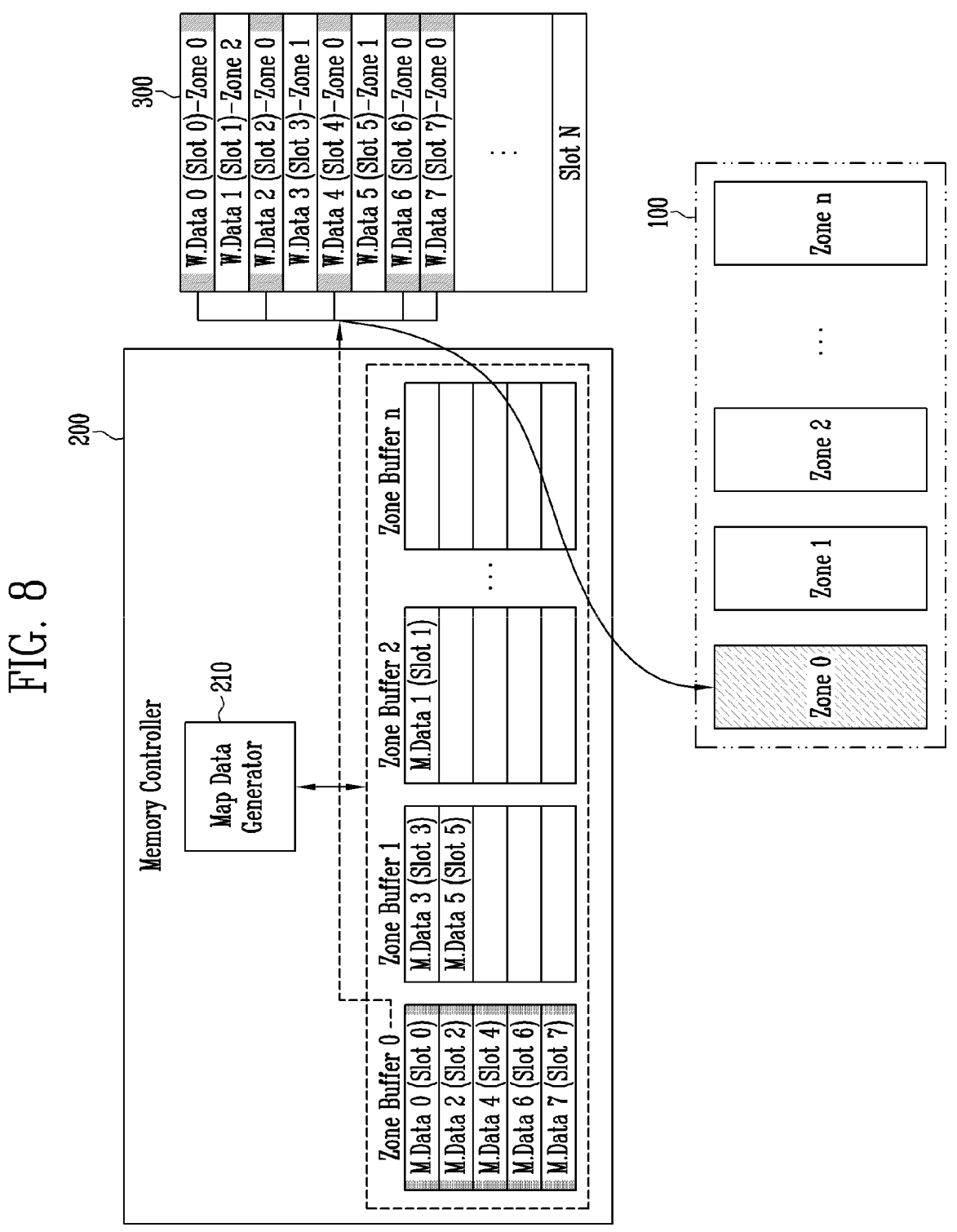
FIG. 8 illustrates a process of storing write data in a storage device according to an embodiment of the present disclosure.

FIG. 8 illustrates a process of storing write data in a storage device according to an embodiment of the present disclosure.

Referring to FIG. 8, map data M. Data 0 corresponding to write data W. Data 0 stored in a slot Slot 0 of a buffer memory device 300, map data M. Data 2 corresponding to write data W. Data 2 stored in a slot Slot 2, map data M. Data 4 corresponding to write data W. Data 4 stored in a slot Slot 4, map data M. Data 6 corresponding to write data W. Data 6 stored in a slot Slot 6, and map data M. Data 7 corresponding to write data W. Data 7 stored in a slot Slot 7 may be stored in a zone buffer Zone Buffer 0.

In addition, map data M. Data 3 corresponding to write data W. Data 3 stored in a slot Slot 3 of the buffer memory device 300 and map data M. Data 5 corresponding to write data W. Data 5 stored in a slot Slot 5 may be stored in a zone buffer Zone Buffer 1.

In addition, map data M. Data 1 corresponding to write data W. Data 1 stored in a slot Slot 1 of the buffer memory device 300 may be stored in a zone buffer Zone Buffer 2.

When a size of map data stored in a zone buffer is greater than or equal to a predetermined size, write data may be stored in a zone corresponding to the zone buffer based on the map data. For example, when a size of map data stored in the zone buffer Zone Buffer 0 is greater than or equal to the predetermined size, write data stored in corresponding slots of the buffer memory device 300 may be stored in a zone Zone 0 corresponding to the zone buffer Zone Buffer 0. Here, the write data stored in the zone Zone 0 may be the write data W. Data 0, the write data W. Data 2, the write data W. Data 4, the write data W. Data 6, and the write data W. Data 7 corresponding to the map data stored in the zone buffer Zone Buffer 0.

That is, write data to be stored in a specific zone may be moved or copied from the buffer memory device 300 to a memory device 100 based on map data including information on a position in the buffer memory device 300 in which the write data is stored.

Figure 9:
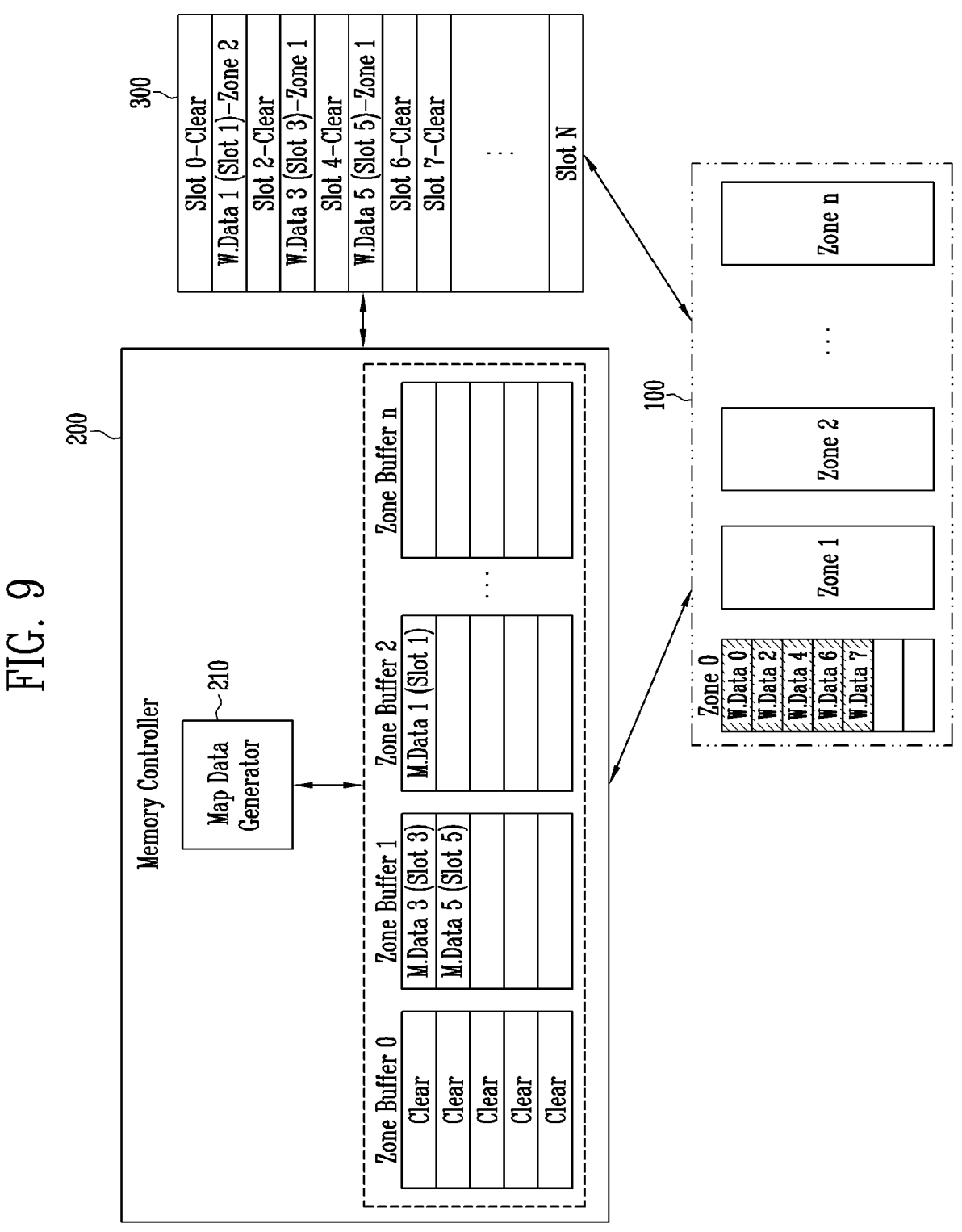
FIG. 9 illustrates a case after write data is stored in a memory device according to an embodiment of the present disclosure.

FIG. 9 illustrates a case after write data is stored in a memory device 100 according to an embodiment of the present disclosure.

Referring to FIG. 9, write data stored in a buffer memory device 300 may be stored in a zone Zone 0 of a memory device 100, and thus slots Slot 0, Slot 2, Slot 4, Slot 6, and Slot 7 in the buffer memory device 300 in which the write data is positioned may be erased or cleared.

In addition, once write data is stored in the zone Zone 0, a zone buffer Zone Buffer 0 in which map data corresponding to the write data is stored may be erased or cleared.

In another embodiment, once the write data is stored in the zone Zone 0, the zone buffer Zone Buffer 0 in which the map data corresponding to the write data is stored may not be erased. Instead, the map data stored in the zone buffer Zone Buffer 0 may be invalidated. That is, the map data stored in the zone buffer Zone Buffer 0 may further include state information indicating whether the map data is valid or not.

As described with reference to FIGS. 6 to 9, the write data may be stored in the buffer memory device 300 without dividing a zone in which the write data is to be stored, and the map data corresponding to the write data may be stored in the zone buffer to indicate the zone in which the write data is to be stored. Thus, there is an advantage in that the zone in the memory device 100 may be managed with relatively small overhead. In addition, there is an advantage in that a memory controller 200 may freely use slots in the buffer memory device 300 without dividing the zone in which the write data is to be stored.

FIG. 10 illustrates a storage device according to another embodiment of the present disclosure.

Referring to FIGS. 1 and 10, the buffer memory device 300 included in the storage device 50 may further include a read area 310. The read area 310 may be an area in which read data received from the memory device 100 is temporarily stored. The read area 310 may be an area used only for buffering the read data, and may not be used for other purposes. The read area 310 may be determined in advance or designated by the memory controller 200.

In addition, the memory controller 200 may include a read buffer 230 in addition to a zone buffer unit 220. The read buffer 230 may correspond to the read area 310 of the buffer memory device 300. That is, the read buffer 230 may be different from the zone buffer unit 220, and may store map data corresponding to the read data stored in the read area 310.

In this case, the memory controller 200 may freely use other areas except for the read area 310 in the buffer memory device 300.

Figure 11:
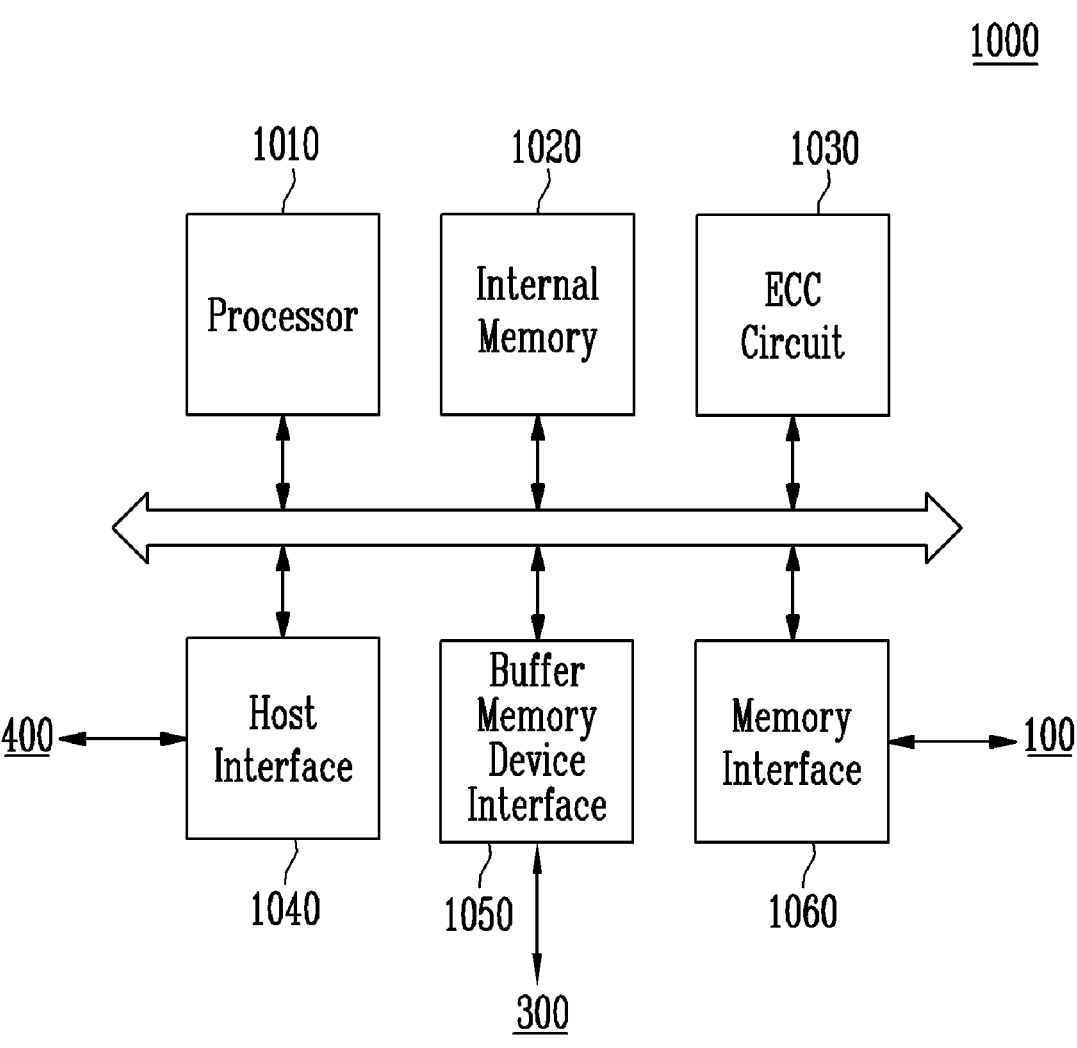
FIG. 11 illustrates a memory controller according to another embodiment of the present disclosure.

FIG. 11 illustrates a memory controller 1000 according to another embodiment of the present disclosure. The memory controller 1000 may correspond to the memory controller 200 described above.

Referring to FIGS. 6, 10, and 11, the memory controller 1000 may include a processor 1010, an internal memory

1020, an error correction code circuit 1030, a host interface 1040, a buffer memory device interface 1050, and a memory interface 1060.

The processor 1010 may perform various operations or may generate various commands for controlling the memory device 100. When receiving a request from the host 400, the processor 1010 may generate a command according to the received request and transmit the generated command to a queue controller (not shown). In an embodiment, the processor 1010 may receive a write request and write data from the host 400 and generate map data corresponding to the write data in response to the write request.

The internal memory 1020 may store various pieces of information necessary for an operation of the memory controller 1000. For example, the internal memory 1020 may include logical and physical address map tables. The internal memory 1020 may be configured of at least one of a random access memory (RAM), a dynamic RAM (DRAM), a static RAM (SRAM), a cache, a tightly coupled memory (TCM), and the like. In an embodiment, a portion of the internal memory 1020 may be used as sectors 211 in which the generated map data is temporarily stored. In addition, another portion of the internal memory 1020 may be used as zone buffers in the zone buffer unit 220 in which the map data is stored. In addition, in another embodiment, still another portion of the internal memory 1020 may be used as the read buffer 230 in which map data corresponding to the read area 310 of the buffer memory device 300 is stored. In an embodiment, the map data may be divided and stored in zone buffers in the zone buffer unit 220 in the internal memory 1020 according to an instruction of the processor 1010.

The error correction code circuit 1030 is configured to detect and correct an error of data received from the memory device 100 using an error correction code (ECC). The processor 1010 may adjust a read voltage according to an error detection result of the error correction code circuit 1030 and control the memory device 100 to perform re-reading. In an exemplary embodiment, an error correction block may be provided as a component of the memory controller 1000.

The host interface 1040 may exchange a command, an address, data, and the like between the memory controller 1000 and the host 400. For example, the host interface 1040 may receive a request, an address, data, and the like from the host 400, and may output data read from the memory device 100 to the host 400. The host interface 1040 may communicate with the host 400 using various protocols.

The buffer memory device interface 1050 may transmit data between the processor 1010 and the buffer memory device 300. The buffer memory device 300 may be used as an operation memory or a cache memory of the memory controller 1000, and may store data used in the storage device 50. The buffer memory device interface 1050 may store write data received from the host 400 through the host interface 1040 in the buffer memory device 300.

In an embodiment, the buffer memory device interface 1050 may store the write data in a specific position in the buffer memory device 300 under the control of the processor 1010. In another embodiment, the buffer memory device interface 1050 may temporarily store the write data in a specific position in the buffer memory device 300 and then notify the processor 1010 of the position in which the write data is stored. The buffer memory device interface 1050 may use the buffer memory device 300 as various buffers under the control of the processor 1010. When a buffer memory is included in the memory controller 1000, the buffer memory device interface 1050 may be omitted.

The memory interface 1060 may exchange the command, the address, the data, and the like between the memory controller 1000 and the memory device 100. For example, the memory interface 1060 may transmit the command, the address, the data, and the like to the memory device 100, and may receive the data and the like from the memory device 100 through a channel. In an embodiment, the memory interface 1060 may divide the write data stored in the buffer memory device 300 and store the divided write data in zones of the memory device 100 based on the map data stored in the internal memory 1020 according to an instruction of the processor 1010.

Figure 12:
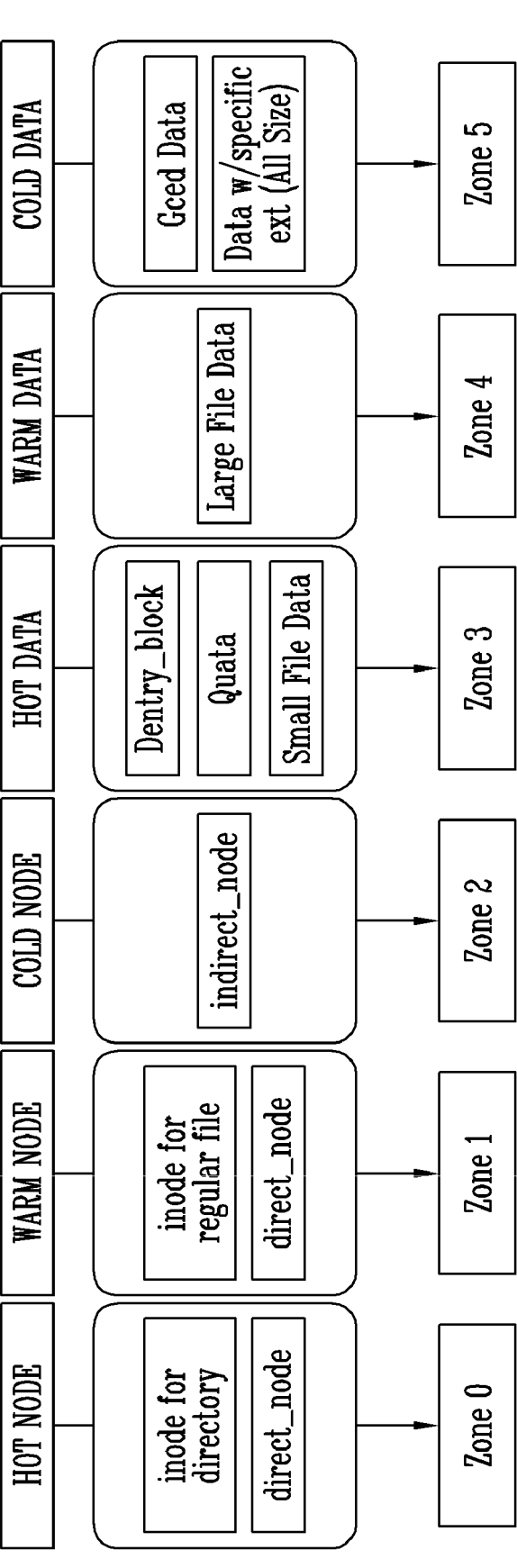
FIG. 12 illustrates an example of data classification.

FIG. 12 illustrates an example of data classification.

Referring to FIGS. 1 and 12, in an embodiment, write data may be classified into a node or data according to a type thereof, and may be classified into hot, warm, or cold according to a frequency of overwrite or update of the write data. Accordingly, write data may be classified into a hot node, a warm node, a cold node, hot data, warm data, cold data, or the like according to properties thereof.

For example, the hot node may be an inode or direct node block for a directory. The hot node may be data that has a very high frequency of overwrite or update and has a high probability of being targeted for garbage collection. The warm node may be an inode or direct node block for a regular file. The warm node may be data that has a high frequency of overwrite or update and has a significant probability of being targeted for the garbage collection. The cold node may be an indirect node block. The cold node may be data that has a low frequency of overwrite and update but has a very high probability of being targeted for the garbage collection.

The hot data may be a directory entry block, quota, or file data of a relatively small capacity of 64 KB or less, and may be data that has a high frequency of overwrite or update compared to other data and has a high probability of being targeted for the garbage collection. The warm data may be a data block created by a user, may be file data of a relatively large capacity of, for example, 64 KB or more, and may be data that has a relatively high frequency of overwrite or update and has a relatively low probability of being targeted for the garbage collection. The cold data may be data moved by the garbage collection, a data block classified as the cold data by the user, or file data having a specific format (e.g., .ex, .db, .jpg, or the like). For example, the cold data may be multimedia file data. The cold data may be data that has a low frequency of overwrite or update and has a low probability of being targeted for the garbage collection. However, the classification of data is not limited to such a method, and may be modified in a method having various criteria.

In an embodiment, write data may be stored in different zones in the memory device 100 according to a type of the classified write data. In an embodiment, as shown in FIG. 12, the hot node may be stored in the zone Zone 0, the warm node may be stored in the zone Zone 1, the cold node may be stored in the zone Zone 2, the hot data may be stored in the zone Zone 3, the warm data may be stored in the zone Zone 4, and the cold data may be stored in the zone Zone 5 in a division manner. However, in another embodiment, two or more types of write data may be stored in one zone.

In an embodiment, a log according to the classification of write data may be provided from an external host. Alternatively, in another embodiment, the memory controller 200 may classify write data based on a property of the write data.

The memory controller 200 may identify a zone in which the write data is to be stored based on the classification of the write data, and thus map data corresponding to the write data may be generated and then stored in a zone buffer corresponding to the zone.

Figure 13:
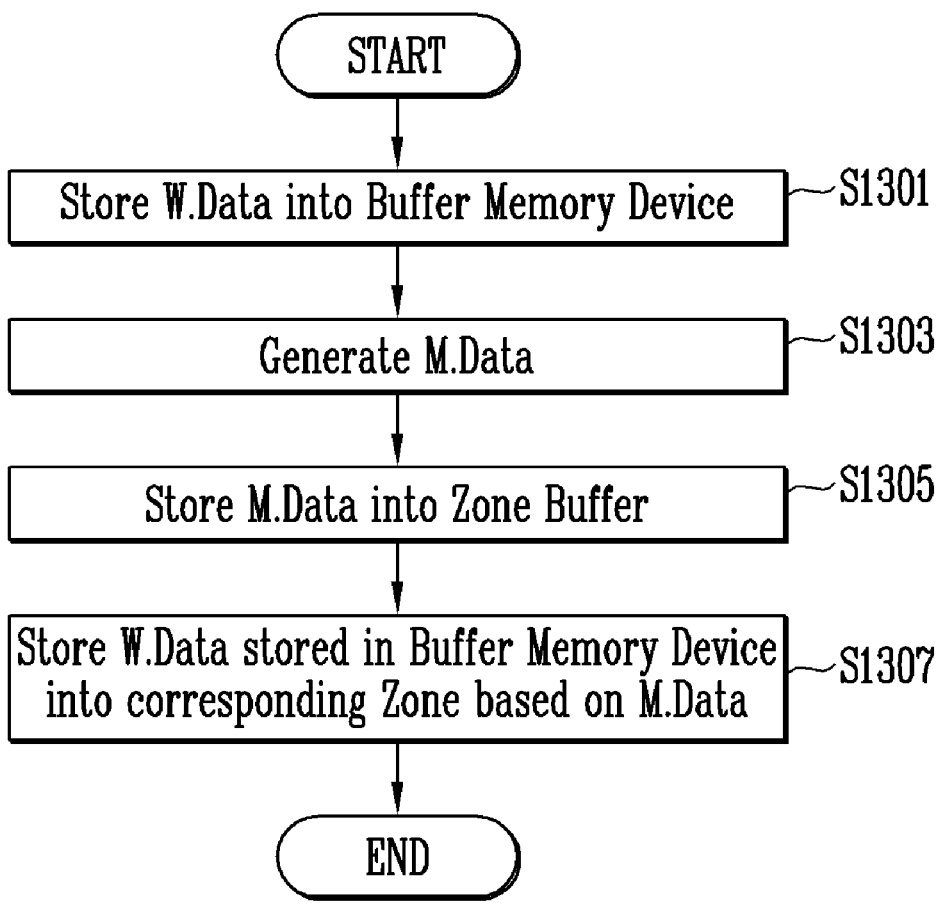
FIG. 13 is a flowchart illustrating a method of operating a storage device according to an embodiment of the present disclosure.

FIG. 13 is a flowchart illustrating a method of operating a storage device according to an embodiment of the present disclosure.

Referring to FIGS. 1 and 13, in step S1301, the memory controller 200 may store write data W. Data in the buffer memory device 300. The storage device 50 may receive the write data W. Data together with a write request from an external host.

In step S1303, the memory controller 200 may generate map data M. Data. The map data M. Data may include information indicating a position in which the write data W.Data is stored in the buffer memory device 300. In an embodiment, the map data M. Data may include information indicating a slot position in the buffer memory device 300 in which the write data W. Data is stored. In an embodiment, the map data M. Data may further include a logical address for the write data W. Data.

In step S1305, the memory controller 200 may store the map data M. Data in a zone buffer. The map data M. Data may be stored in a zone buffer corresponding to a zone in which the write data W. Data is to be stored. The map data M. Data divided and stored in each zone buffer may include information on the zone in which the write data W. Data is to be stored and/or information on a physical address in which the write data W. Data is to be stored.

In step S1307, the memory controller 200 may store the write data W. Data, which is stored in the buffer memory device 300, in the memory device 100. The write data W. Data stored in the buffer memory device 300 may be stored in the zone corresponding to the zone buffer based on the map data M. Data stored in the zone buffer.

Figure 14:
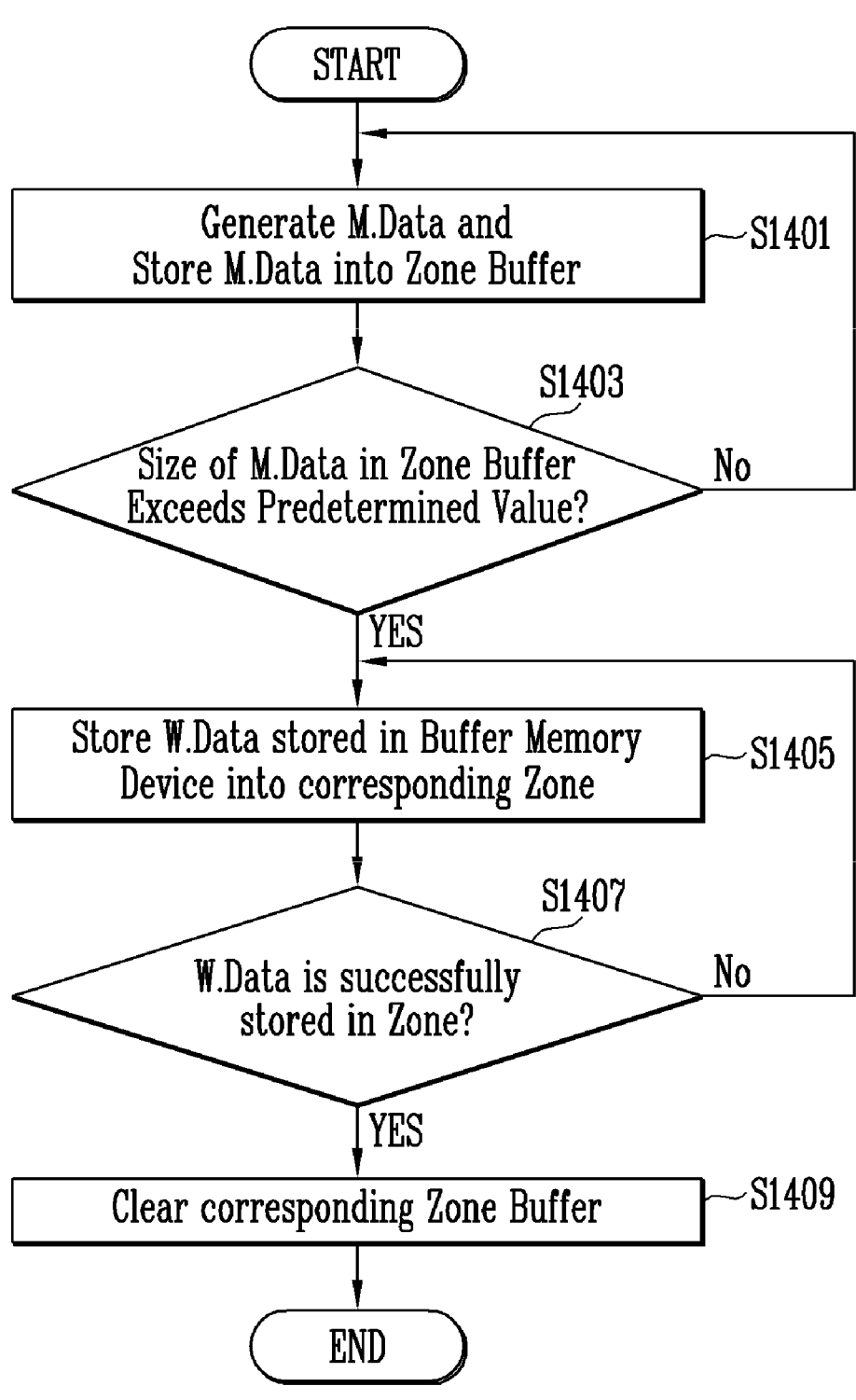
FIG. 14 is a flowchart illustrating a process of storing data in a zone according to an embodiment of the present disclosure in more detail.

FIG. 14 is a flowchart illustrating a process of storing data in a zone in the method illustrated in FIG. 13 according to an embodiment of the present disclosure.

Referring to FIGS. 1, 13, and 14, in step S1401, the memory controller 200 may generate the map data M. Data and store the map data M. Data in the zone buffer. The map data M. Data may include information indicating a position in which the write data W. Data is stored in the buffer memory device 300. The map data M. Data may be stored in a zone buffer corresponding to a zone in the memory device 100 in which the write data W. Data is to be stored. Step S1401 may correspond to steps S1301 to S1305 of FIG. 13.

In step S1403, the memory controller 200 may check whether a size of map data stored in an arbitrary zone buffer among a plurality of zone buffers exceeds a predetermined size. When the size of the map data stored in the arbitrary zone buffer does not exceed the predetermined size, the process may return to step S1401 to repeatedly store write data W. Data in the buffer memory device 300, generate map data M. Data corresponding to the write data W. Data, and store the generated map data M. Data in a zone buffer.

When the size of the map data stored in the arbitrary zone buffer exceeds the predetermined size, in step S1405, the memory controller 200 may store the write data W. Data corresponding to the map data M. Data, which is stored in the arbitrary zone buffer, in a zone corresponding to the arbitrary zone buffer. That is, the memory controller 200 may identify the position in the buffer memory device 300 where the write data W. Data is stored based on the map data M. Data stored in the arbitrary zone buffer, and thus may store the write W. Data in the corresponding zone.

When it is determined in step S1407 that the write data W. Data is not successfully stored in the corresponding zone, the process may return to step S1405, and thus the memory controller 200 may store the write data W. Data in the corresponding zone again.

When it is determined in step S1407 that the write data W. Data is successfully stored in the corresponding zone, the memory controller 200 may clear or erase the arbitrary zone buffer in step S1409. In addition, slots in the buffer memory device 300 in which the write data W. Data has been stored may be erased.

Figure 15:
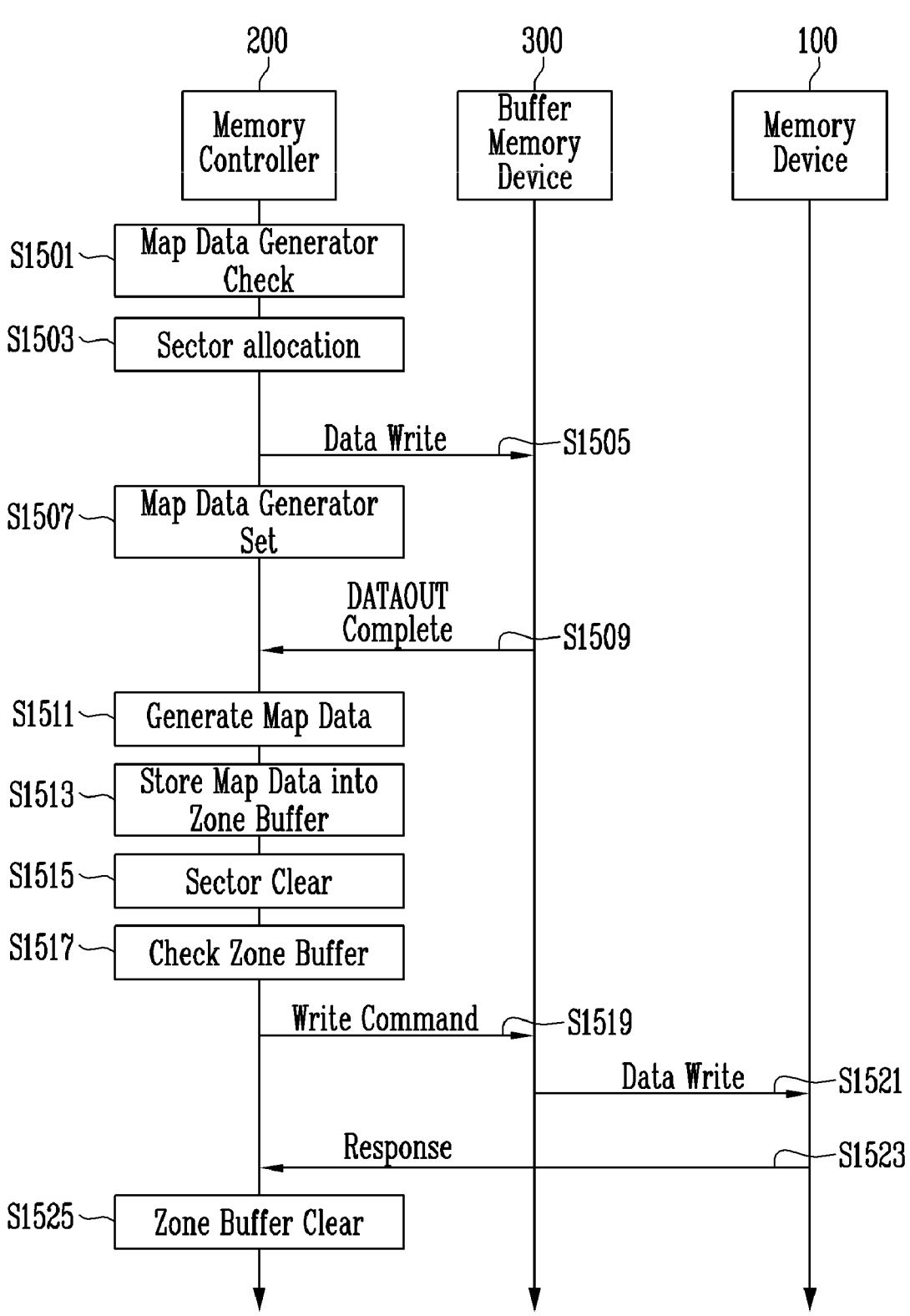
FIG. 15 is a flowchart illustrating a method of operating a storage device according to another embodiment of the present disclosure.

FIG. 15 is a flowchart illustrating a method of operating a storage device according to another embodiment of the present disclosure.

Referring to FIGS. 1, 4 to 6, and 15, in step S1501, the memory controller 200 may check the map data generator 210. In an embodiment, the memory controller 200 may check whether a space exists in the map data generator 210 to store map data. Accordingly, in step S1503, the memory controller 200 may allocate a sector, in which the map data is to be stored, in the map data generator 210.

In step S1505, write data provided from the host may be stored in the buffer memory device 300 under the control of the memory controller 200.

Thereafter, in step S1507, the memory controller 200 may prepare the map data generator 210 to generate the map data. When the write data is stored in the buffer memory device 300, in step S1509, the buffer memory device 300 may notify the memory controller 200 that data out (DATAOUT) is completed.

Accordingly, the memory controller 200 may generate the map data in step S1511. The map data may correspond to the write data stored in the buffer memory device 300 in step S1505, and may include information on a position in the buffer memory device 300 in which the write data is stored. The map data may be preferentially stored in the sector 211 of the map data generator 210.

In step S1513, the memory controller 200 may store the map data, which is stored in the sector 211, in a zone buffer. The zone buffer may correspond to a zone in the memory device 100 where the write data corresponding to the map data is to be stored.

After successfully storing the map data in the zone buffer, the memory controller 200 may clear or erase the sector 211 in which the map data is stored in step S1515.

In step S1517, the memory controller 200 may check the map data stored in the zone buffer unit 220. When a size of map data stored in a specific zone buffer in the zone buffer unit 220 is greater than or equal to a predetermined size, in step S1519, a write command, which requests to store write data, corresponding to the map data stored in the specific zone buffer, in the memory device 100 may be provided to the buffer memory device 300. At this time, the write command may include information based on the map data. For example, information about the position in the buffer memory device 300 where the write data, which is to be stored in the memory device 100, is stored, may be provided. In addition, information about a zone in the memory device 100 where the write data is to be stored may be provided, and the zone in the memory device 100 where the write data is to be stored may be a zone corresponding to the specific zone buffer.

In step S1521, the write data stored in the buffer memory device 300 may be provided to the memory device 100. After completing a write operation of writing the write data in the memory device 100, in step S1523, the memory device 100 may provide a response indicating that the write operation is completed to the memory controller 200.

Upon receiving the response indicating the completion of the write operation, the memory controller 200 may clear the zone buffer corresponding to the zone in which the write data is stored in step S1525. In addition, slots in the buffer memory device 300 in which the write data is stored may also be erased.

FIG. 15 illustrates an example of an operating method of the storage device 50 according to an embodiment of the present disclosure, but embodiments are not limited thereto.

In another embodiment, reception or provision of a request or data performed by the memory controller 200, or internal operations of the memory controller 200 may be performed, provided, or received by the host 400.

In addition, in another embodiment, the reception or the provision of the request or the data performed by the memory controller 200, or the internal operations of the memory controller 200 may be performed by some of a host interface in the memory controller 200 communicating with the host 400, a buffer memory device interface in the memory controller 200 communicating with the buffer memory device 300, a memory device interface in the memory controller 200 communicating with the memory device 100, the map data generator 210, the zone buffers 220, and a processor.

In addition, in another embodiment, requests or data provided or received by the buffer memory device 300 may be provided or received by the buffer memory device interface in the memory controller 200 communicating with the buffer memory device 300.

In addition, in another embodiment, requests or data shown as being received or provided by the memory device 100 may be received or provided by the memory device interface in the memory controller 200 communicating with the memory device 100.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

What is claimed is:

1. A storage device comprising:
a memory device including a plurality of zones;
a buffer memory device including a plurality of slots; and
a memory controller including a plurality of zone buffers that are implemented in an internal memory of the memory controller and respectively correspond to the plurality of zones,
wherein the memory controller is configured to store write data in one or more of the plurality of slots, store map data, including information indicating a position in the buffer memory device in which the write data is stored, in a zone buffer corresponding to a target zone of the write data, and store the write data in the target zone from the buffer memory device based on the map data when a size of the map data stored in the zone buffer is greater than or equal to a predetermined size.

2. The storage device of claim 1, wherein the map data includes position information indicating the one or more slots in which the write data is stored.

3. The storage device of claim 1, wherein the target zone in which the write data is to be stored is determined based on a property of the write data.

4. The storage device of claim 1, wherein the buffer memory device further includes a read area in which read data received from the memory device is temporarily stored.

5. The storage device of claim 4, wherein the memory controller further includes a read buffer implemented in the internal memory of the memory controller, the read buffer corresponding to the read area and distinct from the plurality of zone buffers, storing map data corresponding to the read data.

6. The storage device of claim 1, wherein the write data is at least a portion of data received from an external device.

7. The storage device of claim 1, wherein the memory device includes a plurality of memory dies each including one or more memory blocks.

8. The storage device of claim 7, wherein each of the plurality of zones includes one or more memory blocks in one or more of the plurality of memory dies.

9. The storage device of claim 7, wherein each of the plurality of zones includes a portion of each of memory blocks included in different memory dies.

10. A method of operating a storage device, the method comprising:

storing write data received from an external device in one or more of a plurality of slots in a buffer memory device;

generating map data corresponding to the write data;

storing the map data in a zone buffer, which is implemented in an internal memory of a memory controller and correspond to a target zone in a memory device in which the write data is to be stored; and storing the write data in the target zone from the buffer memory device based on the map data, wherein the map data includes information indicating a position in the buffer memory device in which the write data is stored, and wherein storing the write data in the target zone is performed based on whether a size of the map data stored in the zone buffer corresponding to the target zone is greater than or equal to a predetermined size.

11. The method of claim 10, wherein the map data includes position information indicating the one or more slots in which the write data is stored.

12. The method of claim 10, further comprising erasing the map data stored in the zone buffer when the write data is stored in the target zone.

13. A memory controller comprising:

a map data generator configured to generate map data corresponding to write data based on a position in a buffer memory device in which the write data is stored; and a plurality of zone buffers implemented in an internal memory of the memory controller and respectively corresponding to a plurality of zones in a memory device, wherein the map data is stored in a zone buffer corresponding to a target zone of the write data, among the plurality of zone buffers, wherein the write data is stored in the target zone from the buffer memory device based on the map data, and wherein when a size of the map data stored in the zone buffer is greater than or equal to a predetermined size, the write data stored in the buffer memory device is stored in the target zone corresponding to the zone buffer.

14. The memory controller of claim 13, wherein when the write data is stored in the target zone, the map data stored in the zone buffer is erased.

15. The memory controller of claim 13, wherein the map data generator includes a plurality of sectors, the map data being stored in one or more of the plurality of sectors.

16. The memory controller of claim 15, wherein when the map data is stored in the zone buffer, the map data stored in the one or more sectors is erased.

* * * * *